Jan. 9, 1940.                    D. E. AUSTIN                      2,186,279
                                 SWAY STABILIZER
                              Filed Dec. 27, 1938            2 Sheets-Sheet 1

Inventor
Dwight E. Austin
By
Blakemore, Spencer & Flint
Attorneys

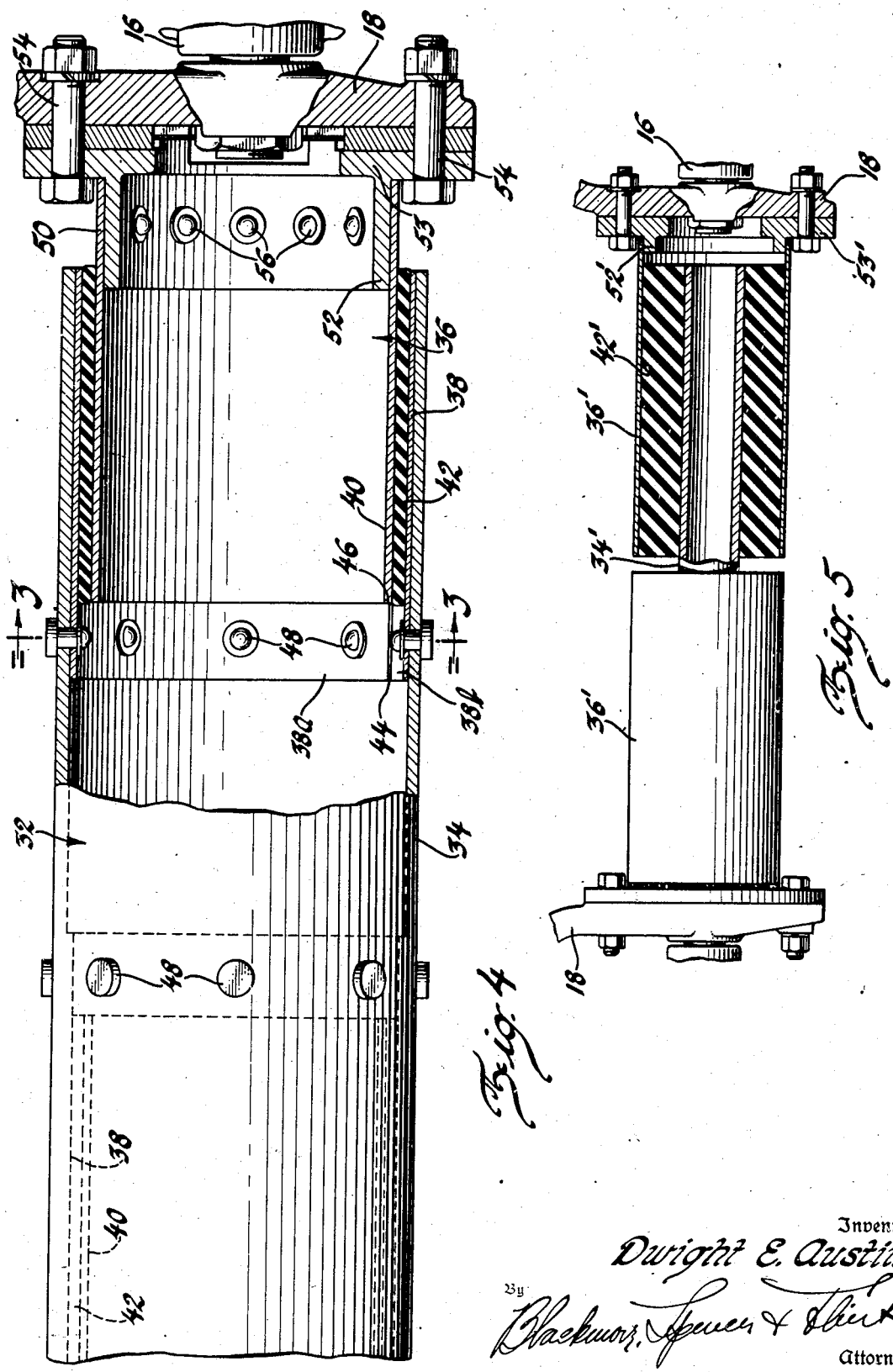

Patented Jan. 9, 1940

2,186,279

UNITED STATES PATENT OFFICE 2,186,279

SWAY STABILIZER

Dwight E. Austin, Orchard Lake, Mich., assignor to Yellow Truck & Coach Manufacturing Company, Pontiac, Mich., a corporation of Maine Application December 27, 1938, Serial No. 247,792

5 Claims. (Cl. 267—11)

This invention relates to stabilizer bars and has particular reference to a stabilizer bar used in connection with the stabilizing mechanism to prevent sway and rolling of automobile bodies.

The novel stabilizer bar of the invention comprises an outer cylindrical bar extending between the side bars of the usual vehicle body or vehicle frame. The bar extends between two shock absorbers which are also mounted on the frame and is connected to the shock absorbers by means of a second concentric cylindrical element which fits inside the first. The space between the inner and outer cylinders is filled with rubber under compression.

As a modification of the construction, the outer cylindrical bar may be made in two pieces and each section connected to the shock absorber while the single rigid or longer bar is in the middle and surrounded by the two shorter pieces and the space between the inner and outer bars filled with rubber under compression.

On the drawings:

Figure 4 is an enlarged longitudinal detailed view through the stabilizer bar.

Figure 5 is a view similar to Figure 4 of a modification.

Figure 1:
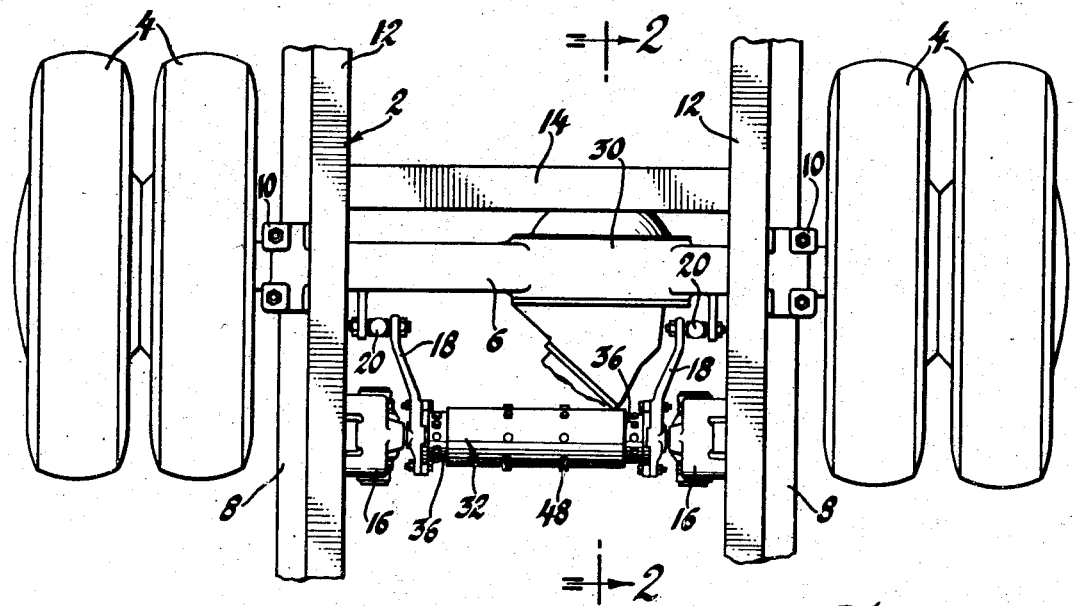
Figure 1 shows a plan view of the rear part of an automotive vehicle with the invention applied.
Figure 2:
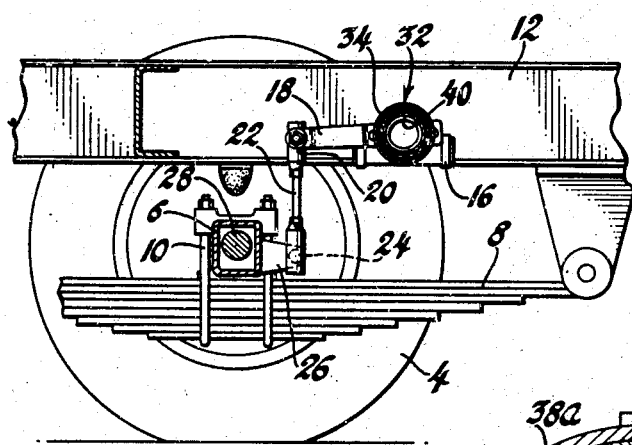
Figure 2 is a sectional view on the line 2—2 of Figure 1.

Referring to the drawings, the numeral 2 indicates an automotive vehicle as a whole. The vehicle has the rear wheels 4 connected by the rear axle 6. The axle 6 has the springs 8 secured thereto at 10 and the ends of the springs 8 are secured to the side bars 12 of the frame in the usual way. The side bars 12 are connected by the transverse members 14, only one of which is shown in the illustration.

Two shock absorbers 16 are rigidly secured to the side members 12 and each shock absorber has an arm 18 connected by a ball joint at 20 to a link 22 connected in turn by a ball joint at 24 to a bracket 26 secured to the rear axle housing 6.

In the rear axle housing the usual live axle 28 is positioned and this axle is operated from the usual differential enclosed in a differential housing 30.

The parts so far described are conventional, and per se form no part of the invention.

The novel stabilizer bar of the invention is indicated as a whole at 32. This stabilizer bar comprises the outer, larger and longer cylindrical bar or member 34 which is in line with the axis of movement of the arms 18 of the shock absorber 16. This cylinder 34 extends between the shock absorbers but terminates short thereof as is best shown in Figure 4.

Figure 3:
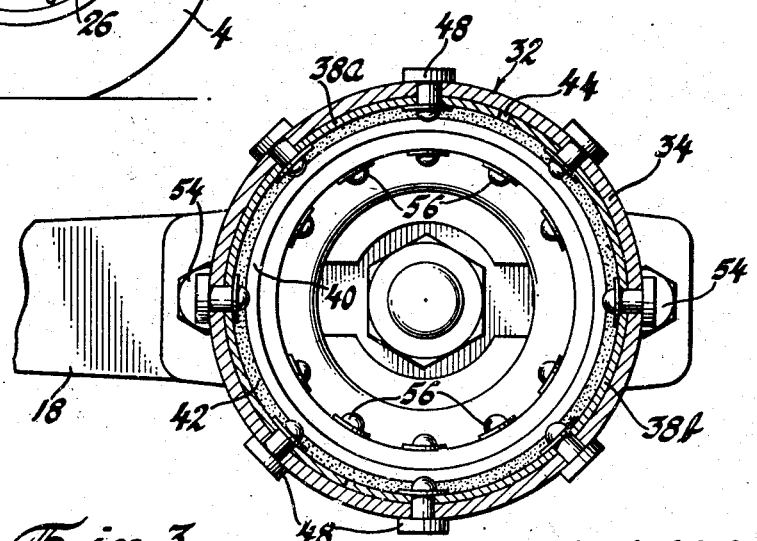
Figure 3 is an enlarged sectional detailed view of the end of the stabilizer bar taken on the line 3—3 of Figure 4.

Two inner shorter cylindrical members 36 are positioned inside the ends of the outer longer cylindrical member 34 and each cylindrical element 36 comprises the outer cylinder 38, the inner cylinder 40, and the intermediate rubber 42. The rubber 42 may be vulcanized to either the cylinder 38 or the cylinder 40, or to both of them. The outer cylinder 38 is in turn composed of semi-cylindrical halves 38a and 38b, the line of separation between the parts 38a and 38b being shown at 44 in Figures 3 and 4.

Part 38 terminates at its outer extremity at the end of the outer cylinder 34 and at its inner extremity it extends beyond the end 46 of the inner cylinder 40. The cylinder 38 is secured to the outer cylinder 34 by means of the rivets 48.

The inner cylinder 36 extends beyond the end of the outer cylinder 34 and this projecting or extending end, indicated at 50, is received over a cylindrical extension 52 of a bracket 53, secured by means of the bolts 54 to the shock absorber arm 18. Parts 50 and 52 are secured together by means of the rivets 56. The rubber 42 between the cylindrical elements 38 and 40 is compressed and this compression is caused by forcing the two semi-cylinders 38a and 38b onto the rubber before the cylinder 38 is placed into the outer cylinder element 34 so that when the stabilizer bar 32 is in use the rubber 42 at both ends thereof is always under compression.

Figure 5 is a modification of the structure shown in Figure 4. In this case the longer cylinder 34' is positioned on the inside of the outer shorter cylinders 36' and between the two cylinders the rubber 42' under compression is positioned. The outer cylinder 36' is secured to the extension 52' on the brackets 53', either by welding or by rivets as shown at 56 in Figure 4.

In the case of the ordinary stabilizer bar, which usually comprises a solid relatively thin rod, when the wheel on one side of the vehicle meets a rut in the road and tends to drop, the stabilizing bar acting across the vehicle will tend to prevent the wheel from dropping in the rut, due to the action of the relatively rigid interconnection between the shock absorber arms and the stabilizer. There will be some torsion in the rod but not enough to interfere with its stabilizing characteristics. In the present instance, due to the tubular construction of most of the parts, there will be relatively little torsion but any necessary yield, equivalent to the usual torsion, will take place in the rubber 42 or 42' which is under rather heavy compression.

In general, the operation and function of the stabilizer is no different from the function and operation of the ordinary stabilizer except that the torsion of the stabilizer of the present invention is taken in the rubber and not in the bar itself.

I claim:

1. A stabilizer bar for application to an automotive vehicle having the usual wheels suspended from the vehicle frame or vehicle body, an outer cylinder extending transversely of the vehicle, two shorter cylinders inside the first cylinder and projecting from the ends thereof, compressed rubber between the two smaller cylinders and the outer cylinder and means to connect the projecting ends of smaller cylinders to the wheel suspension.

2. A stabilizer bar for application to an automotive vehicle having shock absorbers and the usual wheels suspended from a frame or body, an outer cylinder extending transversely of the vehicle, two smaller cylinders inside the outer cylinder and projecting from each end thereof, compressed rubber between the two smaller cylinders and the outer cylinder, means to connect the projecting ends of the smaller cylinders to the shock absorbers, and means to connect the shock absorbers to the wheel suspension.

3. In a stabilizer bar for application to an automotive vehicle, a hollow bar extending transversely of the vehicle, two smaller hollow bars inside the first bar and projecting from the ends thereof, said smaller bars each comprising an inner cylinder, an outer cylinder, and rubber compressed therebetween, said inner hollow bars being secured to the transverse bar, and means to secure the projecting ends of the smaller hollow bars to the vehicle.

4. In a stabilizer bar for application to an automotive vehicle, two short hollow end members comprising an inner cylinder, two semi-cylindrical outer members over the inner cylinder and rubber between the inner cylinder and the outer semi-cylindrical members, said outer semi-cylindrical members being pressed together to form a cylinder and to compress the rubber, said inner cylinders projecting at one end beyond the outer members and beyond the rubber, and the semi-cylindrical members projecting at the other end beyond the rubber and the inner cylinder, and an outer cylindrical member, said short hollow members being inside the ends of the outer cylindrical member, said outer semi-cylindrical members being rigidly secured to the outer cylinder.

5. In a stabilizer bar for an automotive vehicle having wheels and a suspension therefor and having shock absorbers connected with the suspension, two inner smaller cylinders secured at their ends to the shock absorbers, said cylinders projecting toward each other, an outer longer cylinder extending between the smaller cylinders and receiving the smaller cylinders in the ends thereof, and a compressed rubber cylinder between the smaller cylinders and the outer longer cylinder.

DWIGHT E. AUSTIN.